United States Patent [19]
McCallister

[11] Patent Number: 5,818,832
[45] Date of Patent: Oct. 6, 1998

[54] RAPID SYNCHRONIZATION FOR COMMUNICATION SYSTEMS

[75] Inventor: Ronald D. McCallister, Scottsdale, Ariz.

[73] Assignee: SiCOM, Inc., Scottsdale, Ariz.

[21] Appl. No.: 740,016

[22] Filed: Oct. 23, 1996

Related U.S. Application Data

[63] Continuation-in-part of Ser. No. 541,337, Oct. 10, 1995, abandoned.
[51] Int. Cl.$^6$ .................................................. H04L 27/06
[52] U.S. Cl. ............................ 370/350; 375/344; 455/62; 455/71
[58] Field of Search .................................... 370/324, 350; 455/71, 502, 69, 62; 375/344

[56] References Cited

U.S. PATENT DOCUMENTS

| | | | |
|---|---|---|---|
| 5,115,515 | 5/1992 | Yamamoto et al. | 455/71 |
| 5,241,688 | 8/1993 | Arora | 455/502 |
| 5,377,232 | 12/1994 | Davidov et al. | 375/354 |
| 5,390,216 | 2/1995 | Bilitza et al. | 375/354 |
| 5,509,034 | 4/1996 | Beukema | 375/344 |

*Primary Examiner*—Chi H. Pham
*Assistant Examiner*—W. Todd Baker
*Attorney, Agent, or Firm*—Meschkow & Gresham, P.L.C.; Lowell W. Gresham; Jordan M. Meschkow

[57] ABSTRACT

A local multipoint data distribution system (10) simultaneously accommodates many communication sessions occurring at a variety of data rates. Space surrounding cell sites (12) is partitioned into sectors (16), and the spectrum is allocated so that adjacent sectors (16) use different spectrum portions, but the entire spectrum is reused numerous times. A time diversity scheme allocates different numbers of time slots (54) to different calls. Time slot identifiers are assigned in contiguous blocks in an assigned numbering system (56). The time slot identifier assignments are translated into a counted numbering system (58) which causes the time slots (54) for any call to be distributed throughout a frame (48) and interleaved with time slots (54) assigned to other calls. Data communications use a common modulation format and a modulation order that is specifically adapted to a particular call. A spectral coherence technique causes reverse channel signal (158) to be transmitted at a frequency to which a base station demodulator (170) is already synchronized.

13 Claims, 10 Drawing Sheets

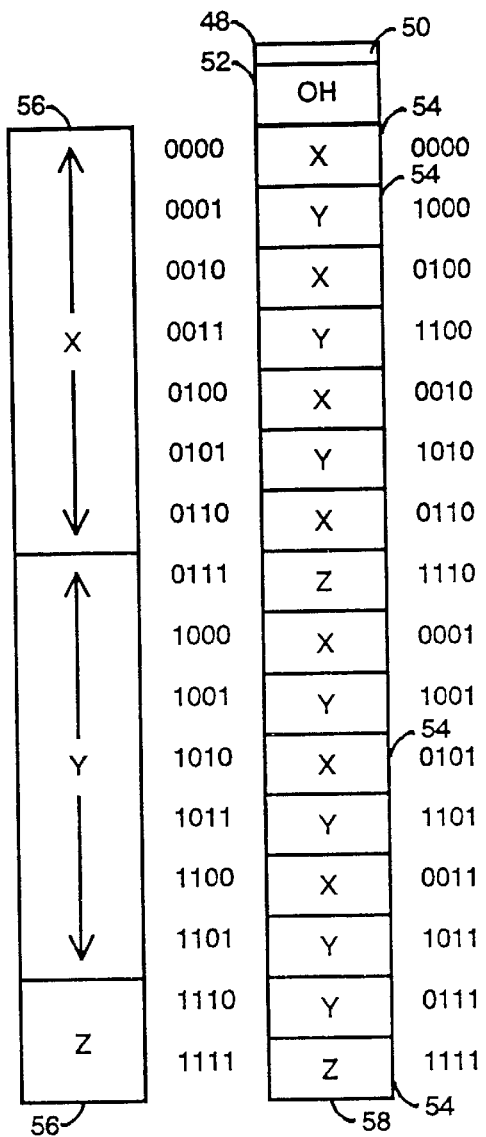
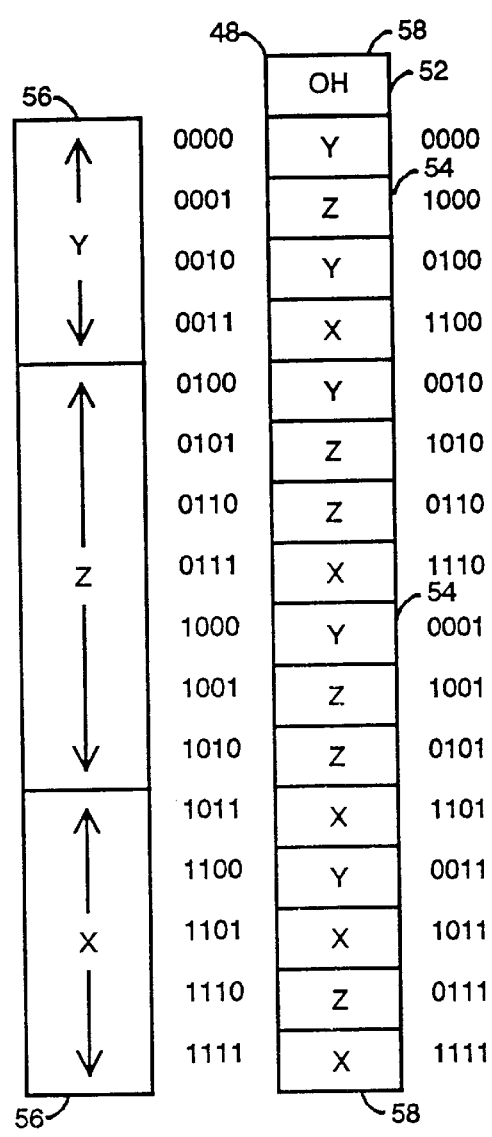
FIG. 3
FIG. 4
FIG. 5
| SU | BLOCK MIN | BLOCK MAX | MODULATION ORDER |
|---|---|---|---|
| ⋮ | ⋮ | ⋮ | ⋮ |
| X | 0 | 6 | 2 |
| Y | 7 | D | 3 |
| Z | E | F | 4 |

# RAPID SYNCHRONIZATION FOR COMMUNICATION SYSTEMS

RELATED APPLICATIONS

The present invention is a Continuation In Part of Ser. No. 08/541,337, filed Oct. 10, 1995 now abandoned, entitled "Multirate Local Multipoint Distribution System" by Daniel Davidson Shearer III, Ronald D. McCallister, Robert J. Dahl, John M. Liebetreu, and Robert J. Solem.

TECHNICAL FIELD OF THE INVENTION

The present invention relates generally to local multipoint distribution and other communication systems (LMDS). More specifically, the present invention relates to an LMDS implementation which simultaneously accommodates communication sessions occurring at a wide variety of data rates and which efficiently utilizes a given LMDS spectrum.

BACKGROUND OF THE INVENTION

Local multipoint distribution systems (LMDS) are RF cellular data communication systems which augment or replace wired land-line telecommunications available to stationary subscribers. Typically, an LMDS operates in or near the $K_a$ band where a wide portion of the electromagnetic spectrum may be dedicated for exclusive use by the LMDS. This wide bandwidth allows LMDS subscribers to communicate data at much higher data rates than may be currently accommodated through wired land-line connections. An LMDS need not entirely replace the public switched telecommunications network (PSTN). Rather, an LMDS may couple to a PSTN and use the PSTN to trunk bulk communications. Desirably, an LMDS replaces or augments the final wiring links between a central office and subscribers' premises much like conventional cellular communication systems use RF communications as a final link to cellular radiotelephone subscriber units.

However conventional LMDS systems use their allocated spectrum inefficiently. A typical LMDS has an architecture similar to architectures used in conventional cellular technology. Accordingly, spectrum reuse is limited, data rates are either inflexible from user to user and call to call or minimally alterable, and the system is not efficiently configured to accommodate a stationary subscriber population. Limited spectrum reuse is undesirable because the overall amount of call traffic which can be carried by the LMDS spectrum in a given area is likewise limited. A mobile subscriber-population architecture rather than a stationary subscriber-population architecture leads to inefficient spectrum usage. For example, when a portion of the LMDS spectrum is consumed in overhead communications to resolve Doppler shift and insure that acceptable signal levels exist throughout an entire cell, such spectrum is not available for subscriber data traffic.

A highly undesirable feature of a conventional LMDS is an inability to efficiently support a wide variation in data rates to different subscriber units. Conventional cellular systems predominantly permit data rates consistent with voice communication. While some telecommunication systems permit subscriber communication at higher and lower data rates, the higher data rates are not sufficiently different from the lower data rates to provide significant advantages, and few subscribers actually take advantage of the modestly higher data rates. Consequently, inefficiencies pose no serious problems. However, the wide bandwidths supported by an LMDS can be vastly higher than low data rates which are consistent with voice communication, and a majority of subscribers subscribe to an LMDS to have the vastly higher data rates. Consequently, a need exists for an LMDS that efficiently accommodates a wide range of data rates for different subscribers.

In many radio communication systems, such as conventional LMDS or time division multiple access (TDMA) burst systems, a number of independent data transmitting and receiving stations (Subscriber Units) have access to a single base station (Cell Site) on a time-division basis such that the available time for use of the base station is allocated among the Subscriber Units in some manner. For purposes of the present invention, the term "cell site" will be considered the same as "base station." The performance of these systems depends to a large degree on the efficiency with which the functions of rapid synchronization and demodulation are performed.

With burst mode communications, there is the problem of frequency synchronization of the base station receiver to the Subscriber Unit's return channel timeslot transmitting frequency using current technology. The problem is caused, at least in part, by noise and uncertainty of the received signal. Excessive time required to acquire or synchronize the received signal translates into extremely low operating efficiencies.

It will be appreciated from the foregoing that there has been a need for an improved method of synchronization in radio communication systems. The present invention fulfills this need by providing a method of rapid synchronization that greatly reduces the time required for system overhead.

SUMMARY OF THE INVENTION

Accordingly, it is an advantage of the present invention that an improved local multipoint distribution system (LMDS) is provided.

Another advantage of the present invention is that an LMDS simultaneously accommodates a wide range of data rates.

Another advantage of the present invention is that an LMDS efficiently utilizes a given LMDS spectrum.

Another advantage of the present invention is that an LMDS efficiently exploits the physical characteristic of power loss versus distance to increase overall network capacity.

Another advantage of the present invention allows rapid synchronization of a subscriber unit transmit signal to a base station receiver.

The above and other advantages of the present invention are carried out in one form by a method for rapid synchronization of a subscriber unit transmitting frequency to a base station receiving frequency. This method involves the steps of transmitting a frequency adjustment constant from a base station to a subscriber unit, extracting the constant at the subscriber unit, and using it to calculate a radio frequency multiplier. This multiplier is used to generate the subscriber unit transmit frequency used during a reverse channel timeslot.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows an exemplary allocation of time slots for use in a forward RF channel;

FIG. 4 shows an exemplary allocation of timeslots for use in a reverse RF channel;

FIG. 5 shows a table which records data rate assignment parameters in association with subscriber unit (SU) identities;

DETAILED DESCRIPTION OF THE PREFERRED EMBODIMENTS

Figure 1:
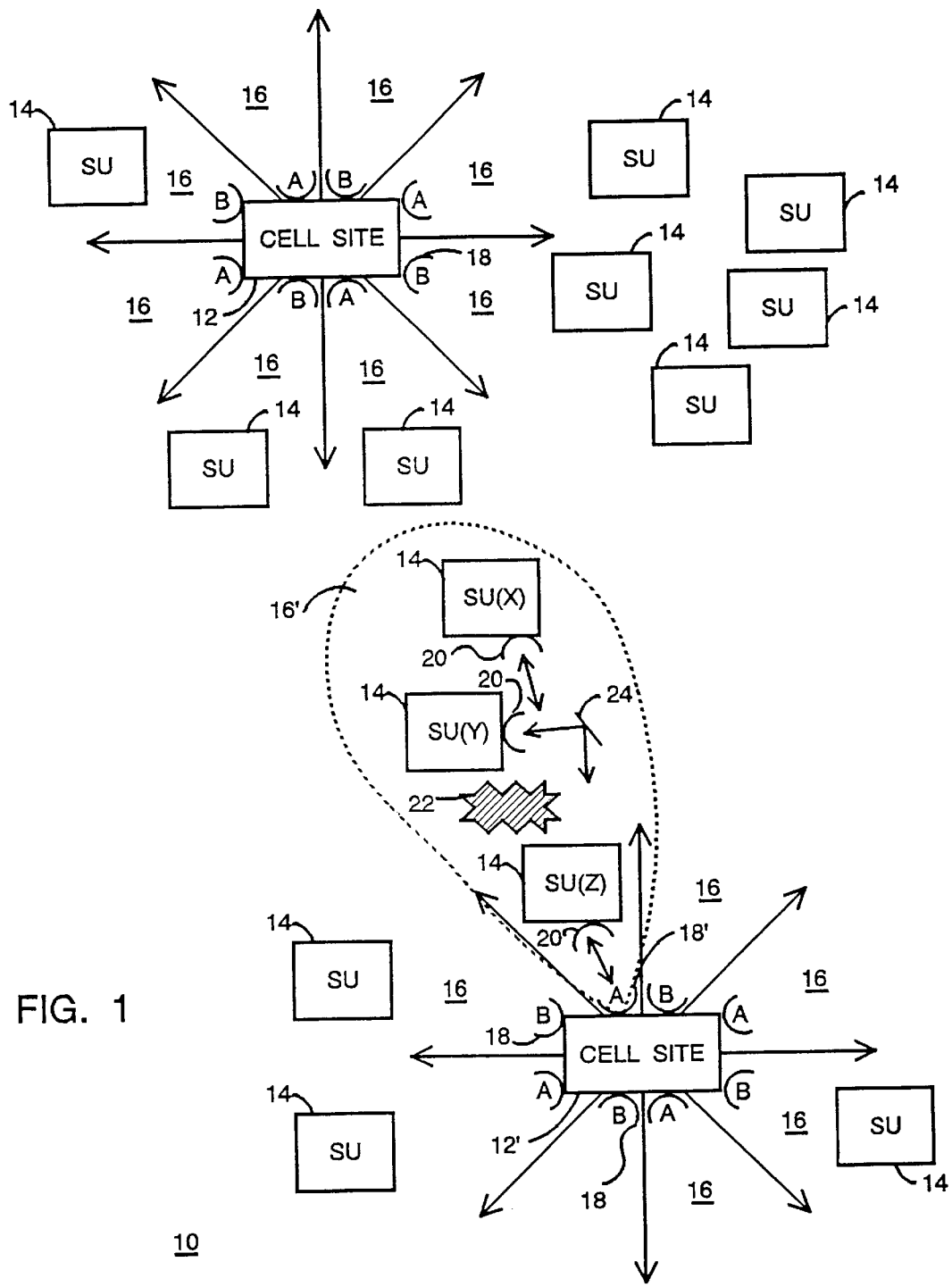
FIG. 1 shows a layout diagram of an environment in which a local multipoint distribution system (LMDS) configured in accordance with the present invention may be practiced.

FIG. 1 shows a layout diagram of an environment in which a local multipoint distribution system (LMDS) configured as a multirate, local multipoint data distribution system 10 may be practiced. System 10 includes any number of geographically separated cell sites 12. FIG. 1 depicts two adjacent cell sites 12 and 12', which are geographically separated without other cell sites 12 being located therebetween. Some overlap may exist in the cellular coverage areas between adjacent cell sites 12. Cell sites 12 are locations from which RF data communications with nearby subscriber units 14 are controlled. Cell sites 12 may couple to a public switched telecommunications network (not shown) or other data communication network.

Desirably, cell sites 12 and subscriber units 14 are generally stationary. Subscriber units 14 tend to remain at a fixed location throughout the duration of a call and from call to call. In addition, subscriber units 14 may be energized from a public power distribution network rather than from batteries so that transmission power levels may be established without concern about maintaining battery reserves. Each cell site 12 may control RF data communications with any number of subscriber units 14 which may be located nearby.

System 10 conducts RF communications using an assigned wide bandwidth LMDS spectrum. In the preferred embodiment, this spectrum may have a bandwidth up to 1 GHz or more and is positioned in or around the $K_a$ band. Those skilled in the art will appreciate that the wide bandwidth nature of this assigned spectrum permits the conveyance of vast amounts of data in short periods of time. System 10 is configured so that this bandwidth simultaneously accommodates high data rate applications, such as real time video or higher, and low data rate applications, such as voice. Moreover, system 10 is configured so that numerous simultaneous communication sessions, or calls, at both high and low data rates may efficiently take place.

System 10 uses frequency, time, and spatial diversity to simultaneously accommodate numerous calls. Frequency diversity is used so that nearby communications take place simultaneously at different frequencies without causing interference. Forward channels convey communications away from cell sites 12, and reverse channels convey communications toward cell sites 12. Desirably, communications occur on forward and reverse channels at different frequencies so that forward and reverse channels are operated simultaneously without requiring significant overhead communications to manage bi-directional communications in a common frequency band.

Moreover, each cell site 12 independently manages communications in numerous discrete sectors 16 within the cell supported by the cell site 12. FIG. 1 illustrates each cell site 12 as having eight of sectors 16. Sectors 16 are formed by aiming a plurality of directional antennas 18 away from a cell site 12 in a plurality of diverse angles or directions. Frequency diversity is used so that different frequency sets of forward and reverse channels are used in adjacent sectors 16. FIG. 1 illustrates these as frequency sets "A" and "B." The use of frequency diversity in adjacent sectors 16 prevents interference between communications which may take place near the common boundaries between the adjacent sectors 16.

The configuration of system 10 to accommodate spatial diversity allows reuse of the entire common LMDS frequency spectrum at each cell site 12. While system 10 divides the LMDS frequency spectrum among diverse directions so that no divided portion of the LMDS spectrum is reused in adjacent sectors 16, the LMDS spectrum is available for reuse in non-adjacent sectors 16. Thus, for the eight-sector example depicted in FIG. 1, frequency set A is reused four times at each cell site 12, and frequency set B is reused four times at each cell site 12. Consequently, the entire common LMDS frequency spectrum is reused four times at each cell site 12. Of course, those skilled in the art will appreciate that the use of different numbers of sectors 16 leads to different amounts of frequency reuse.

The stationary nature of cell sites 12 and subscriber units 14 and the high frequency at which system 10 operates promote this spatial diversity scheme. Cell sites 12 may transmit only on common forward channel frequencies and may receive only on common reverse channel frequencies. Conversely, subscriber units 14 may receive only on the forward channel frequencies and transmit only on the reverse channel frequencies. No interference occurs between cell sites 12, and no interference occurs between subscriber units 14.

As illustrated in FIG. 1, cell site 12' has a directional antenna 18' which is aimed generally toward subscriber units 14 SU(X), SU(Y), and SU(Z) to form a sector 16'. Sector 16' uses frequency set A. Those skilled in the art will appreciate that electromagnetic energy at or near the $K_a$ band propagates substantially in a line-of-sight path. Thus, frequency set A communications in sector 16' do not interfere with frequency set A communications in other sectors 16 for cell site 12'. Likewise, subscriber units 14 incorporate directional antennas 20. Subscriber units SU(X) and SU(Z) have antennas 20 generally aimed at cell site antenna 18'. Thus, interference is prevented with communications taking place in other sectors 16 of cell site 12' and in other sectors 16 of other cell sites 12.

The line-of-sight propagation path may be blocked by obstructions, such as an obstruction 22 positioned between antenna 18' and subscriber unit SU(Y) in FIG. 1. Obstruction 22 may be a hill, building, or other structure. In order to obtain complete coverage within sector 16', a passive reflector 24 is oriented to reflect forward and reverse channels between antenna 18' of cell site 12' and antenna 20 of subscriber unit SU(Y). Passive reflector 24 may be implemented at little cost using a substantially flat, polished metal sheet. Antenna 20 of subscriber unit SU(Y) is desirably aimed at passive reflector 24 rather than at antenna 18'. Passive reflector 24 is preferably oriented to achieve the desired reflection. Thus, communications with an obstructed subscriber unit are conducted through a low cost passive reflector.

Subscriber units 14 within a common sector 16 managed by a common cell site 12 share a common frequency and space allocation. Time diversity prevents interference between simultaneous or concurrent communications. In particular, simultaneous communications taking place between subscriber units SU(X), SU(Y) and SU(Z) do not interfere with one another because these subscriber units engage in communication sessions using different sets of time slots allocated within timing frames. Desirably, all communications are digital RF communications which employ a common modulation format, such as PSK. However, different communication sessions may be established to operate at different modulation orders. For example, simultaneous communications may take place in which either 2 (BPSK), 4 (QPSK), 8 (8-PSK), 16 (16-PSK), or more bits are conveyed per baud. Modulation order and time slot allocation are controlled to vary data rates from call to call.

Figure 2:
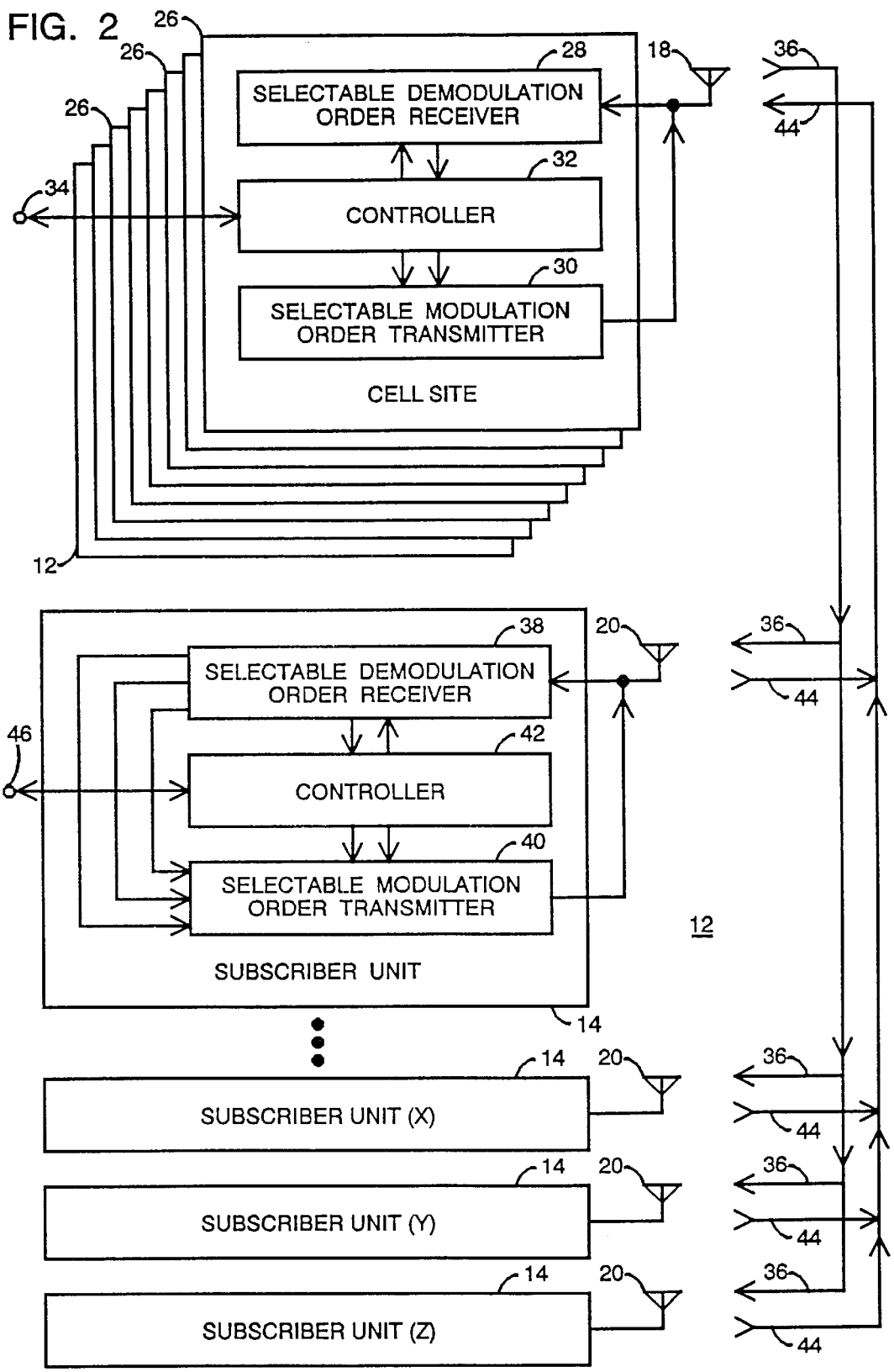
FIG. 2 shows a block diagram of an LMDS configured in accordance with the present invention.

FIG. 2 shows a block diagram of a single cell site 12 of system 10 (see FIG. 1). Cell site 12 may be partitioned into a number of units 26, each of which independently control communications for a particular sector 16 (see FIG. 1). Alternatively, cell site 12 may use a common unit which controls communications for all sectors 16. In either embodiment, cell site 12 includes a receiver 28 configured so that a demodulation order can be selected, a transmitter 30 configured so that a modulation order can be selected, and a controller 32. Receiver 28 and transmitter 30 couple to controller 32. Data may pass through a data port 34 to and from a data network, such as a public switched telecommunications network. Controller 32 routes data from data network port 34 to transmitter 30 and from receiver 28 to network port 34. In addition, controller 32 operates in conjunction with receiver 28 and transmitter 30 to measure the quality of signals received at cell site 12, assign time slots to calls, establish modulation orders at which to communicate with subscriber units 14, and perform call setup processes.

For each sector 16, cell site 12 broadcasts an outgoing signal over a forward RF channel 36. Subscriber units 14 residing in each sector 16 share the sector's forward channel 36 and have antennas 20 (see FIG. 1) aimed to receive the outgoing signal. Each subscriber unit 14 is desirably configured like the other subscriber units 14. In particular, each subscriber unit 14 has a receiver 38 configured to receive the forward signal and so that a demodulation order can be selected, a transmitter 40 configured so that a modulation order can be selected, and a controller 42. Receiver 38 and transmitter 40 couple to controller 42. In addition, receiver 38 generates coherence signals which couple to transmitter 40. These coherence signals cause reverse signals transmitted from various ones of subscriber units 14 in a reverse channel 44 to be temporally and spectrally coherent with the outgoing signals broadcast in forward channel 36.

Data may pass through a data port 46 to and from customer premises equipment which uses and supplies the data. Controller 42 routes data from data port 46 to transmitter 40 and from receiver 38 to data port 46. In addition, controller 42 operates in conjunction with receiver 38 and transmitter 40 to configure messages transmitted on reverse channel 44 in response to the outgoing signal broadcast on forward channel 36, measure the quality of signals received at the subscriber unit 14, perform call setup processes, and engage in communication sessions.

FIG. 3 shows an exemplary allocation of time slots for use in forward RF channel 36, and FIG. 4 shows an exemplary allocation of timeslots for use in reverse RF channel 44. Referring to FIGS. 3 and 4, channels 36 and 44 are temporally divided into frames 48. Although FIGS. 3 and 4 show only one frame 48 each, frames 48 repeat indefinitely. Forward channel 36 includes a frame marker section 50 to convey data which indicate the beginning of frames 48. Frame marker section 50 may be omitted from reverse channel frames 48 because reverse channel frames are temporally coherent with forward channel frames at the cell site. Consequently, when subscriber units 14 identify the beginning of frames 48 in forward channel 36, the beginnings of frames 48 in reverse channel 44 are likewise identified, after timing offsets which compensate for propagation delay are taken into account.

Frames 48 for forward and reverse channels 36 and 44 each have overhead (OH) sections or channels 52. Overhead channels 52 are used to convey overhead communications related to controlling RF communication links and setting up calls rather than to convey subscriber data traffic. In forward channel 36, overhead channel 52 may convey messages which inform subscriber units 14 of calls being directed to the subscriber units 14, of identities of time slots to use for upcoming calls, of timing offsets to use to compensate for propagation delays, and the like. Such messages include data which represent addresses or identities for the subscriber units 14 to which the messages are being directed. In reverse channel 44, overhead channel 52 operates in accordance with a slotted aloha protocol. Through this overhead channel 52, subscriber units 14 may transmit messages which request the allocation of various communication resources to a call involving the subscriber units 14. These messages include data which represent addresses or identities for the subscriber units 14 making the requests.

As an example and for the sake of clarity, FIGS. 3 and 4 illustrate frames 48 as being divided into sixteen time slots 54 each. However, frames 48 may desirably include many more time slots 54. In the preferred embodiment, time slots 54 assigned to subscriber units 14 are evenly distributed throughout frames 48. The even distribution of time slots throughout frames 48 is desirable because it reduces the amount of memory buffering required in subscriber units 14 and cell site 12 and reduces delay. FIGS. 3 and 4 indicate that all sixteen time slots 54 in frame 48 are assigned for use in ongoing calls with subscriber units SU(X), SU(Y), and SU(Z) (see FIG. 1). However, nothing requires all time slots 54 in a frame 48 to be assigned.

In addition, nothing requires the assignment of excess spectrum to low data rate calls. Subscriber units 14 not engaged in a call are assigned no time slots 54. Of those subscriber units 14 engaged in calls, each call is assigned a quantity of time slots 54 per frame 48 which accommodates a requested data rate. Nothing requires different calls to be assigned the same number of time slots 54, and different calls may freely convey data at different data rates. Moreover, nothing requires the same data rates or time slots 54 to be applied in both forward and reverse channels 36 and 44 for a single call.

In a preferred embodiment, time slots 54 are assigned as a contiguous block of time slot identifiers in an "assigned"

numbering system 56. The sizes of these blocks are responsive to data rates selected for the calls and the modulation orders at which data communications take place. Assigned numbering system 56 does not describe the temporal arrangement of time slots 54 within a frame 48. However, assigned numbering system 56 represents a convenient and efficient technique for conveying the assigned time slots identifiers from cell site 12 to a subscriber unit 14 without using an undesirable amount of overhead communications.

A "counted" numbering system 58 describes the temporal arrangement of time slots 54 within a frame 48. Translation operations are performed at cell site 12 and at subscriber units 14 to convert between assigned and counted numbering systems 56 and 58. Thus, time slots identifiers are assigned to a call in accordance with assigned numbering system 56. Using assigned numbering system 56, the time slots identifiers assigned to a subscriber unit 14 for use during a call are expressed as a contiguous block of time slots identifiers. However, through translation to or from counted numbering system 58, the contiguous block of time slots is evenly distributed through frame 48 and interleaved with time slots 54 assigned to other calls.

The preferred embodiment uses a translation operation which is easily and inexpensively implemented. In particular, translation is performed by reversing bit order significance to convert between counted and assigned numbering systems 58 and 56 and between assigned and counted numbering systems 56 and 58. Most significant bits in one system become least significant bits in the other system, least significant bits in one system become most significant bits in the other system, and so on. As illustrated in the example situation depicted in FIGS. 3 and 4, this translation operation evenly distributes time slots 54 throughout frame 48.

FIG. 5 shows a table 60 maintained at a cell site 12 to record data rate assignment parameters in association with subscriber unit 14 identities. In particular, FIG. 5 depicts an exemplary assignment which is consistent with the assignment example set forth in FIGS. 3 and 4 and is consistent with the relative placement of subscriber units SU(X), SU(Y), and SU(Z) illustrated in FIG. 1. As indicated by ellipsis, any number of calls may be ongoing at any given instant for any sector 16 (see FIG. 1) supported by a cell site 12.

The contiguous blocks of time slot identifiers (see FIGS. 3 and 4) assigned to calls in accordance with assigned numbering system 56 are expressed by the first and last time slot identifiers in the block. Thus, all time slot identifiers assigned to a call are confined to being greater than or equal to a "block min" value and to being less than or equal to a "block max" value when time slots 54 are expressed in assigned numbering system 56.

As discussed in greater detail below, modulation order is selected in response to signal quality. Generally speaking, subscriber units 14 located nearer to cell site 12 receive a better quality signal from cell site 12, and cell site 12 receives a better quality signal from nearer subscriber units 14. Better quality signals result in part from the phenomenon of signal strength decreasing as the distance between a signal transmitter and a signal receiver increases. Signal strength is typically inversely proportional to the third to fifth power of the distance, with more serious signal strength decrease in urban areas than rural areas. A large portion of the signal decrease with distance may be addressed by antenna design. However, a significant portion of the signal variance is also dependent upon individual link quality. This portion is dependent on factors such as rain, shadowing, dust, nearby grounding geometries, and the like. It is this individual link quality factor that may be improved with compensation applied differently in different links. Due to improved signal quality, communications with subscriber units 14 located nearer to cell site 12 or with better quality links regardless of location may operate at higher modulation orders while maintaining an adequate bit error rate.

Table 60 records how modulation order may be set to exploit signal quality. Table 60 may be established and maintained through the operation of a process performed at cell site 12 and discussed below in connection with FIG. 8. Subscriber unit SU(Z) is located closest to cell site 12 in FIG. 1, and table 60 reflects that a communication session with subscriber unit SU(Z) takes place at a modulation order of four bits per baud and requires two time slots 54 per frame 48. Subscriber unit SU(X) is located farthest from cell site 12 in FIG. 1, and table 60 reflects that a communication session with subscriber unit SU(X) takes place at a modulation order of two bits per baud and requires seven time slots 54 per frame 48. Table 60 indicates that the highest data rate for this example is being provided to subscriber unit SU(Y), which takes place at a modulation order of three bits per baud and requires seven time slots 54 per frame 48.

Figure 6:
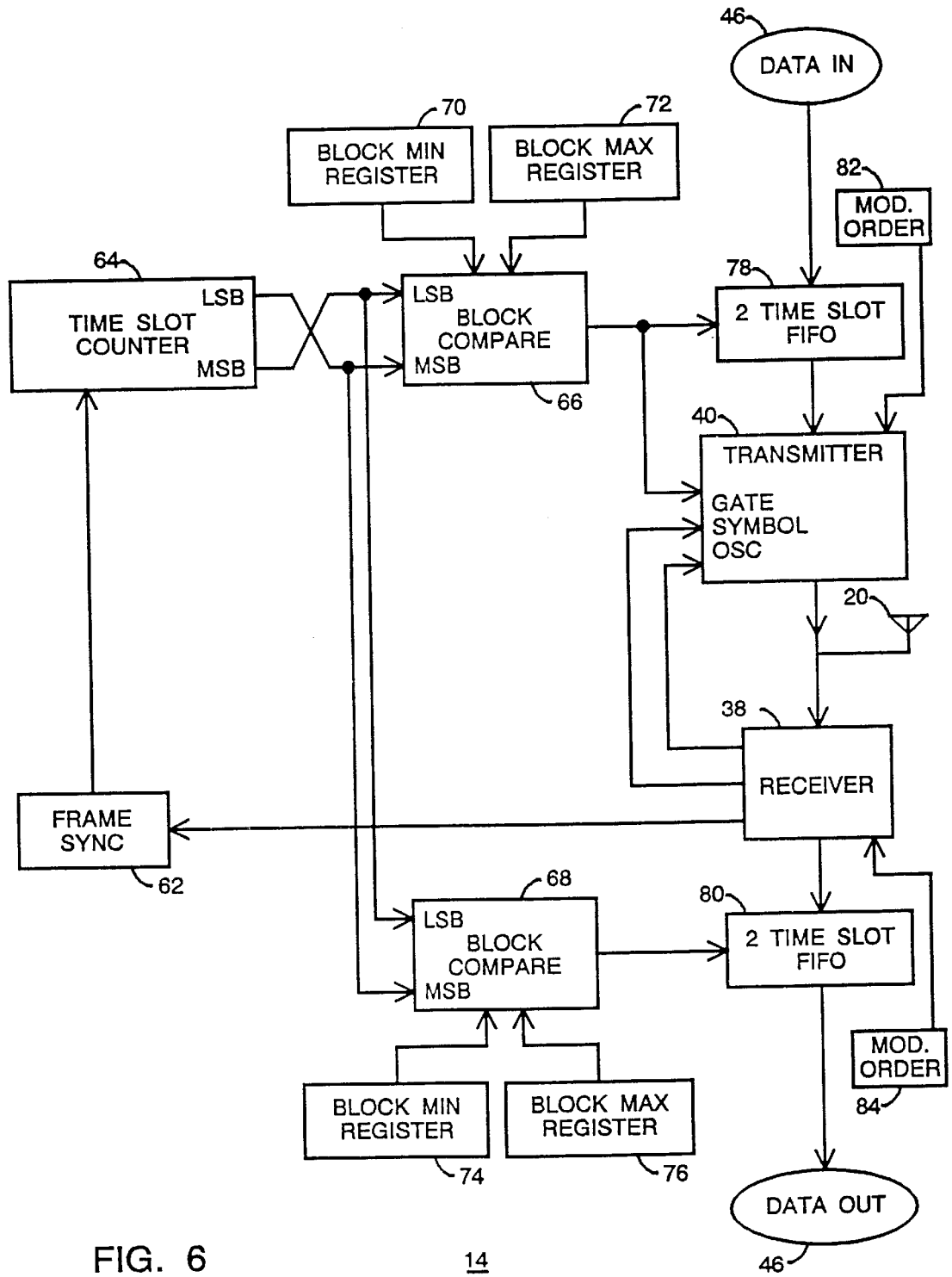
FIG. 6 shows a block diagram of a subscriber unit.

FIG. 6 shows a block diagram of a subscriber unit 14 which, among other things, translates between assigned numbering system 56 and counted numbering system 58 (see FIGS. 3 and 4). Antenna 20 couples to an input of receiver 38. In addition, an output of transmitter 40 couples to antenna 20 or to a separate transmit antenna (not shown). Receiver 38 continually monitors forward channel 36 (see FIG. 2). Through this continual monitoring, receiver 38 gains the phase (i.e. spectral coherence) and symbol timing (i.e. temporal coherence) of the outgoing signal on forward channel 36. Oscillation and symbol timing signals are fed from receiver 38 to transmitter 40 so that subscriber unit 14 transmits signals over reverse channel 44 (see FIG. 2) in spectral and temporal coherence with the outgoing signal. Due to the temporal and spectral coherence of reverse channel 44 to forward channel 36, each subscriber unit's assigned time slots need not be wasted communicating overhead preambles or other data patterns which are intended to allow a receiving party to acquire a signal and which do not convey subscriber data. Since cell site 12 and subscriber unit 14 remain relatively stationary, no overhead communications need take place to resolve Doppler.

Of course, those skilled in the art will appreciate that spectral coherence of reverse channel 44, which may use one frequency, to forward channel 36, which may use another frequency, does not imply a static phase relationship between the two channels. Rather, the frequency and possibly the phase of reverse channel 44 exhibits a known relationship to forward channel 36 and varies as frequency and phase in forward channel 36 varies. Desirably, receiver 28 at cell site 12 (see FIG. 2) needs to resolve no more than a phase offset of reverse channel 44 during any time slot 54 (see FIGS. 3 and 4). Those skilled in the art will appreciate that this permits receiver 28 to acquire reverse channel 44 almost instantly for each time slot 54.

Referring back to FIG. 6, data decoded in receiver 38 are routed to a frame synchronization (sync) section 62. Section 62 detects frame markers 50 (see FIG. 3) in forward channel 36 to indicate the beginning of frames 48. An output from section 62 couples to a time slot counter 64. Time slot counter 64 is synchronized to frame timing by being reset, preset, or cleared at the beginning of each frame 48 in response to the output from frame sync section 62. Following the beginning of each frame, counter 64 increments in synchronism with time slot timing to count or otherwise determine the time slot identities in accordance with counted numbering system 58 (see FIGS. 3 and 4). Of course, incrementing may be delayed as needed to accommodate overhead channel 52 (see FIGS. 3 and 4).

Time slot counter 64 generates a time slot count which is expressed by a binary word having a bit significance order. Translation between counted numbering system 58 and assigned numbering system 56 occurs by reversing the bit significance order of the time slot count. Thus, the least significant output bit of time slot counter 64 couples to the most significant bit of comparison inputs for a transmit block compare circuit 66 and a receive block compare circuit 68, and the most significant output bit of time slot counter 64 couples to the least significant bit of the comparison inputs of circuits 66 and 68.

Circuits 66 and 68 compare the translated time slot count with transmit and receive block min and block max values. These values have been previously communicated to subscriber unit 14 from cell site 12. A block min value for transmit time slots is saved in a register 70, a block max value for transmit time slots is saved in a register 72, a block min value for receive time slots is saved in a register 74, and a block max value for receive time slots is saved in a register 76. Registers 70 and 72 couple to comparison inputs of circuit 66, and registers 74 and 76 couple to comparison inputs of circuit 68. Block compare circuit 66 activates an output during a transmit time slot 54, as translated into assigned numbering system 56 from counted numbering system 58, which is within the contiguous block assigned to the subscriber unit 14. Block compare circuit 68 activates an output during a receive time slot 54, as translated into assigned numbering system 56 from counted numbering system 58, which is within the contiguous block assigned to the subscriber unit 14.

The output of compare circuit 66 couples to an advance data input of a first in, first out (FIFO) memory 78, and the output of compare circuit 68 couples an advance data input of a FIFO memory 80. In addition, the output of compare circuit 66 couples to a gate input of transmitter 40. A modulation order register 82 couples to transmitter 40 and a modulation order register 84 couples to receiver 38. Control data are written into registers 82 and 84 to select modulation and demodulation order, respectively.

Data flow from port 46 (see FIG. 2) into FIFO memory 78, which need buffer no more than the amount of data which may arrive at port 46 in two assigned time slots 54, assuming that data arrive at a relatively constant rate. For high data rate applications, this represents significant memory savings over applications which require a frame of data to be buffered. Data flow out from FIFO 78 to transmitter 40 when enabled by compare circuit 66. Thus, data are transmitted on reverse channel 44 only when assigned time slots 54 occur. Moreover, these data are temporally and spectrally coherent at cell site 12 with forward channel 36 so that cell site 12 can instantly acquire the transmitted signal. In addition, the data are transmitted using a modulation order specified by a data value in register 82.

Data flow from receiver 38 to FIFO memory 80 when enabled to do so by the output from compare circuit 68. FIFO memory 80 also need to buffer no more than the amount of data which may be transferred out from FIFO memory 80 to data port 46 in two assigned time slots 54, assuming that data may be taken from FIFO memory 80 at a relatively constant rate. Thus, data received over forward channel 36 are routed through FIFO memory 80 when assigned time slots 54 occur. Although not shown in FIG. 6, additional controls may be provided to transmit and receive data during overhead channels 52 (see FIGS. 3 and 4).

Figure 7:
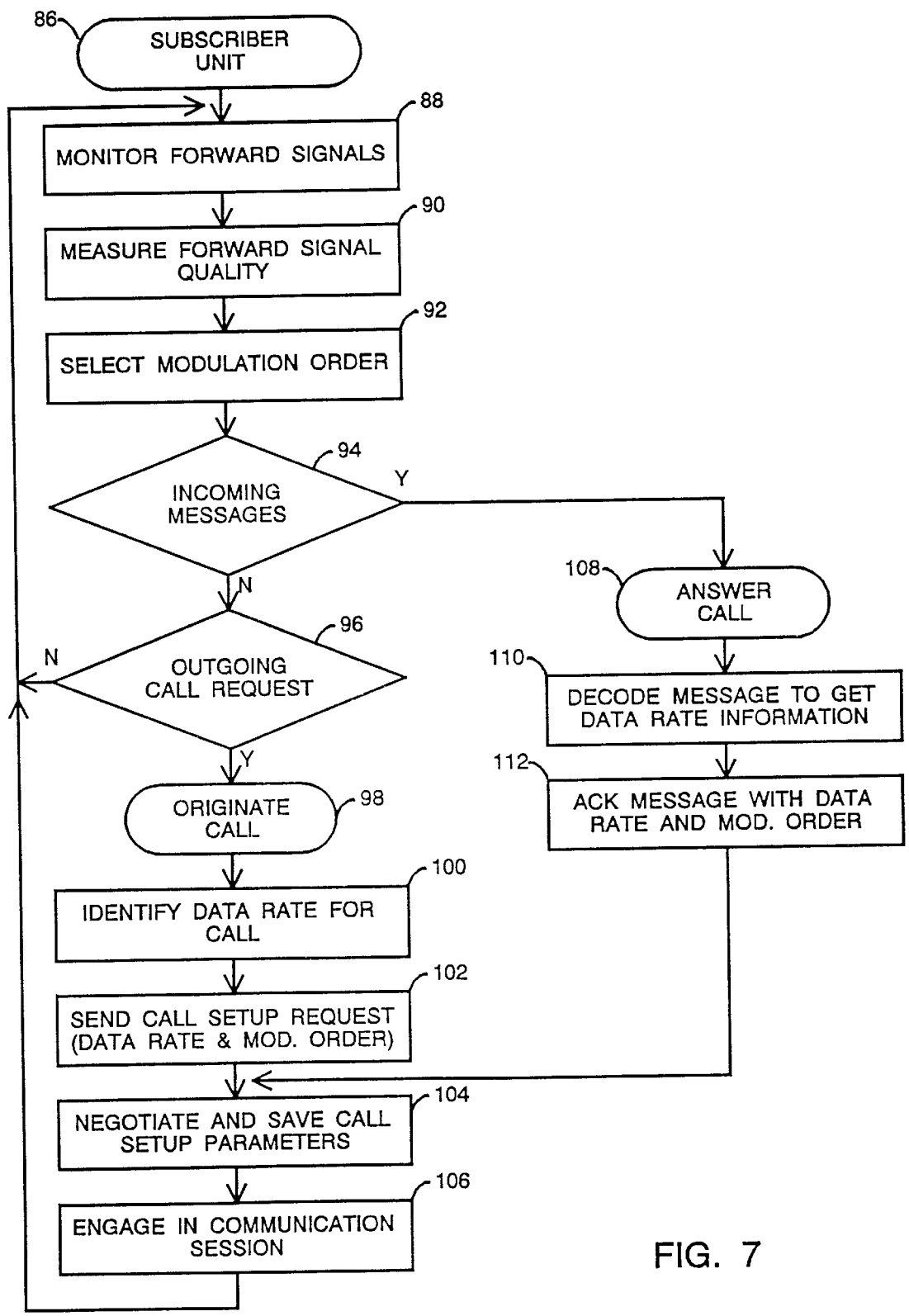
FIG. 7 shows a flow chart of a process performed by a subscriber unit.

FIG. 7 shows a flow chart of a process 86 performed by a subscriber unit 14. Desirably, all subscriber units 14, including subscriber units 14 sharing common frequency and sector or space allocations, perform processes similar to process 86. Process 86 is controlled by software programming stored at and executed at controller 42 (see FIG. 2).

Process 86 includes a task 88 which monitors forward signals being received in forward channel 36 (see FIG. 2). In a task 90, process 86 measures the quality of the forward signals. Task 90 may, for example, monitor bit error rate, signal strength, or other predictors of signal quality. Tasks 88 and 90 are performed in conjunction with signals provided by receiver 38 (see FIGS. 2 and 6).

After task 90, a task 92 selects a modulation order at which cell site 12 may transmit to subscriber unit 14. At task 92, subscriber unit 14 is not necessarily engaged in any communication session. The selected modulation order represents a prediction about whether the subscriber unit 14 could demodulate at 2, 4, 8, 16, and so on, bits per baud while maintaining an adequate bit error rate. The selection may be based, at least in part, upon the signal quality measured above in task 90. In addition, the selection may be based upon historical data regarding a modulation order used in prior communication sessions.

After task 92, a query task 94 determines whether any incoming messages addressed to the subscriber unit 14 have been received. Such incoming messages may be received from overhead channel 52 (see FIG. 3). Overhead channel 52 may be operated at a predetermined default modulation order, such as 2 bits per baud, which achieves a high likelihood of successful communication throughout sector 16. Desirably, such messages are short and efficiently coded so that many messages directed to many subscriber units 14 may be conveyed during every frame 48 (see FIG. 3).

If task 94 determines that no incoming message has been received, a query task 96 determines whether an external signal to subscriber unit 14 indicates a request to make an outgoing call. Such an external signal may, for example, be provided when a subscriber wishes to originate a call or otherwise wishes to engage in a communication session through system 10. If task 96 does not detect an outgoing call request, program control loops back to task 88 to continue monitoring forward channel 36.

When task 96 detects an outgoing call request, process 86 performs an originate call sequence 98, beginning with a task 100. Task 100 identifies a desired data rate to use during the upcoming call. The data rate may but need not be explicitly specified. For example, the data rate may be specified through a code supplied to subscriber unit 14 indicating whether a video call, voice call, or computer data call is being requested. A video call may require a guaranteed high data rate which does not significantly vary throughout the duration of the call, a voice call may require a guaranteed low data rate which does not significantly vary throughout the duration of the call, and a computer data call may accommodate a data rate which best meets system needs at the moment and which may vary throughout the duration of the call. Of course, those skilled in the art may devise additional classes of calls which have their own data rate requirements.

After task 100, a task 102 sends a call setup request message to cell site 12 over overhead channel 52 of reverse channel 44. The call setup request message may include the data rate request determined in task 100 and the modulation order selected in task 92.

After task 102, a task 104 negotiates and saves call setup parameters. Negotiation is performed with cell site 12 and takes place through the exchange of messages through overhead channels 52 of forward and reverse channels 36 and 44. The negotiated call setup parameters include modulation order, time slot block allocations, timing offsets which account for propagation delay, and the like. Thus, even though a data rate and modulation order may have been previously requested, these parameters are not established for an upcoming call until task 104 is performed. As discussed above, the data rate is established through the assignment of a modulation order and a time slot block allocation expressed in accordance with assigned numbering system 56. Modulation order and time slot block allocations may be independently established for forward and reverse channels 36 and 44. Modulation order allocations are saved in registers 82 and 84 (see FIG. 6), and time slot block allocations are saved in registers 70, 72, 74, and 76 (see FIG. 6).

Next, a task 106 engages in a communication session. Subscriber data are communicated during the assigned time slots using the assigned modulation order. A data rate which is desirable for this call has been specified. Since other subscriber units 14 perform process 86, they may simultaneously engage in communication sessions using data rates which are desirable for the other calls. A wide range of data rates are supported through the independent assignment of time slots to each call and the even distribution of assigned time slots throughout frames. Overhead or control communications related to the call may take place through overhead channels 52 of forward and reverse channels 36 and 44 or through the traffic channels defined by the assignment of time slots to the call. Such overhead communication may change time slot and modulation order assignments to best meet overall communication service demands placed upon cell site 12 and may indicate when a call is terminated. When the call terminates, program control loops back to task 88 to continue monitoring forward channel 36.

Referring back to task 94, when an incoming message is detected from cell site 12 over forward channel 36 at subscriber unit 14, process 86 performs an answer call sequence 108. Of course, nothing requires an incoming message to relate to answering a call, and if the incoming message does not relate to setting up a call originated elsewhere, subscriber unit 14 may respond appropriately (not shown).

Sequence 108 includes a task 110 which decodes the message to get data rate information from the message. The data rate information may be viewed as a request to engage in a call at a specified data rate. After determining whether the requested data rate is supported at the subscriber unit 14, a task 112 sends an acknowledgment to the message which specifies a data rate and modulation order. If the requested data rate is supported by the subscriber unit 14, then this data rate may be returned in the acknowledgment message. If the requested data rate is not supported, then the acknowledgment message may indicate the highest data rate supported by the subscriber unit. The modulation order returned in task 112 was determined above in task 102. The acknowledgment message may be returned over overhead section 52 of reverse channel 44.

After task 112, program control proceeds to task 104 to negotiate and save call setup parameters and to engage in a communication session having a data rate specified for the call.

Figure 8:
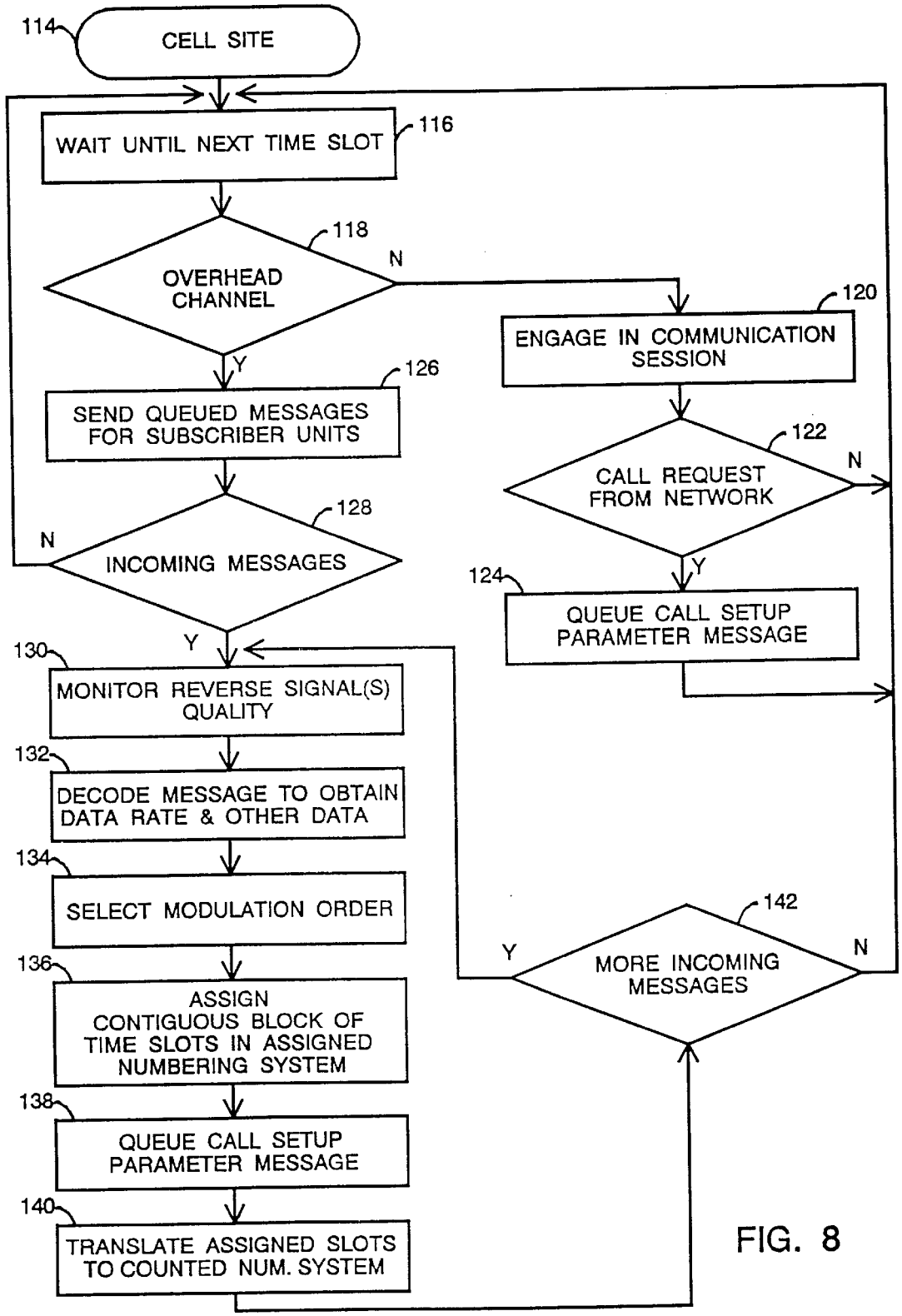
FIG. 8 shows a flow chart of a process performed by a cell site.

FIG. 8 shows a flow chart of a process 114 performed by a cell site 12 to support communication services in each sector 16. Process 114 is controlled by software programming stored at and executed at controller 32 (see FIG. 2).

Process 114 includes a task 116 which synchronizes process 114 to the timing for time slots 54 in frame 48 (see FIGS. 3 and 4). In particular, program control may wait at task 116 until the beginning of the next time slot. After task 116, a query task 118 determines whether the time slot corresponds to an overhead channel 52 (see FIGS. 3 and 4). If an overhead channel 52 is not encountered, a task 120 engages in a communication session in accordance with previously defined time slot assignments. In particular, data is routed from data port 34 (see FIG. 2) to forward channel 36 and from reverse channel 44 to data port 34 in accordance with prior assignments and resource allocations made for an ongoing call. Of course, if no assignments have been made for the current time slots, then task 120 may be omitted. Task 120 may refer to table 60 (see FIG. 5) in routing communications.

FIG. 8 illustrates a query task 122 as occurring after task 120, but task 122 may actually occur concurrently with task 120. Query task 122 determines whether a call request has been received from a communication network which couples to data port 34 (see FIG. 2). If no request to setup a call has been detected, program control loops back to task 116 to await the beginning of the next time slot. In practice, program control may exit tasks 120 and 122 at the end of a time slot 54 and proceed immediately to task 118.

When task 122 detects a call request to a subscriber unit 14 located in the sector 16 for process 114, a task 124 queues a call setup parameter message. This message may specify a requested modulation order and data rate. The modulation order may be based upon historical data. The requested data rate may have been provided to process 114 in the call request obtained from the network. After task 124, program control loops back to task 116 to process the next time slot.

When task 118 detects the occurrence of overhead channel 52, a task 126 sends queued messages over forward channel 36. For example, call setup messages may have been queued earlier during task 124. After or concurrently with task 126, a query task 128 determines whether any incoming messages have been received over overhead section 52 of reverse channel 44. If no overhead messages are received, then program control loops back to task 116 to process the next time slot.

When task 128 detects an incoming message, a task 130 monitors reverse signal quality for the incoming messages. Task 128 may monitor signal strength, bit error rate, or any other predictor of signal quality. After task 130, a task 132 decodes the incoming message to obtain the data rate and other information conveyed in the incoming message. Next, a task 134 selects a modulation order. Task 134 may select the modulation order in response to the signal quality monitored above in task 130 and/or in response to historical data describing modulation order assignments for prior communication sessions with the subscriber unit 14 originating the incoming message.

Although not shown, process 114 may queue and respond to additional messages with the subscriber unit 14 in order to negotiate agreed to modulation order and data rate call setup parameters. When a data rate and modulation order have been agreed to between cell site 12 and the subscriber unit 14, a task 136 assigns contiguous blocks of time slots in assigned numbering system 56 (see FIGS. 3 and 4) for forward and reverse channel usage. The size of the assigned blocks of time slots is dependent upon the data rate for the upcoming call and the modulation order for the upcoming call. The data rate is selected in response to messages from the subscriber unit. The assigned blocks of time slots and modulation order may be recorded in table 60 (see FIG. 5). Tasks 130, 132, 134, and 136 are or have been performed independently for all subscriber units 14 within the subject sector 16 engaging in a call. Thus, other data rates and other modulation orders are selected for other subscriber unit calls.

After task 136, a task 138 queues the call setup parameter message for transmission to the subscriber unit 14 during a subsequent overhead channel 52. This message conveys the modulation order and time slot block assignments to the subscriber unit 14. Next, a task 140 translates the assigned time slots into counted numbering system 58 (see FIGS. 3 and 4). As discussed above, this translation may occur through a reversal of bit significance order in the preferred embodiment. The results of the translation are stored in a table (not shown) for use in other table look-up operations during task 120, discussed above. In particular, the table may be accessed by providing a counted time slot identity in task 120. The table's contents will inform task 120 of the identity of a subscriber unit 14 to whom the time slot has been assigned.

After task 140, program control proceeds to a query task 142 to determine whether more incoming messages need to be processed. If additional incoming messages require processing, program control loops to task 130 to process another message. Of course, if looping back to task 130 might risk losing a time slot, tasks 130 et. seq. may be performed in parallel with tasks 120 and 122, discussed above. If no additional messages remain, program control loops back to task 116.

Figure 9:
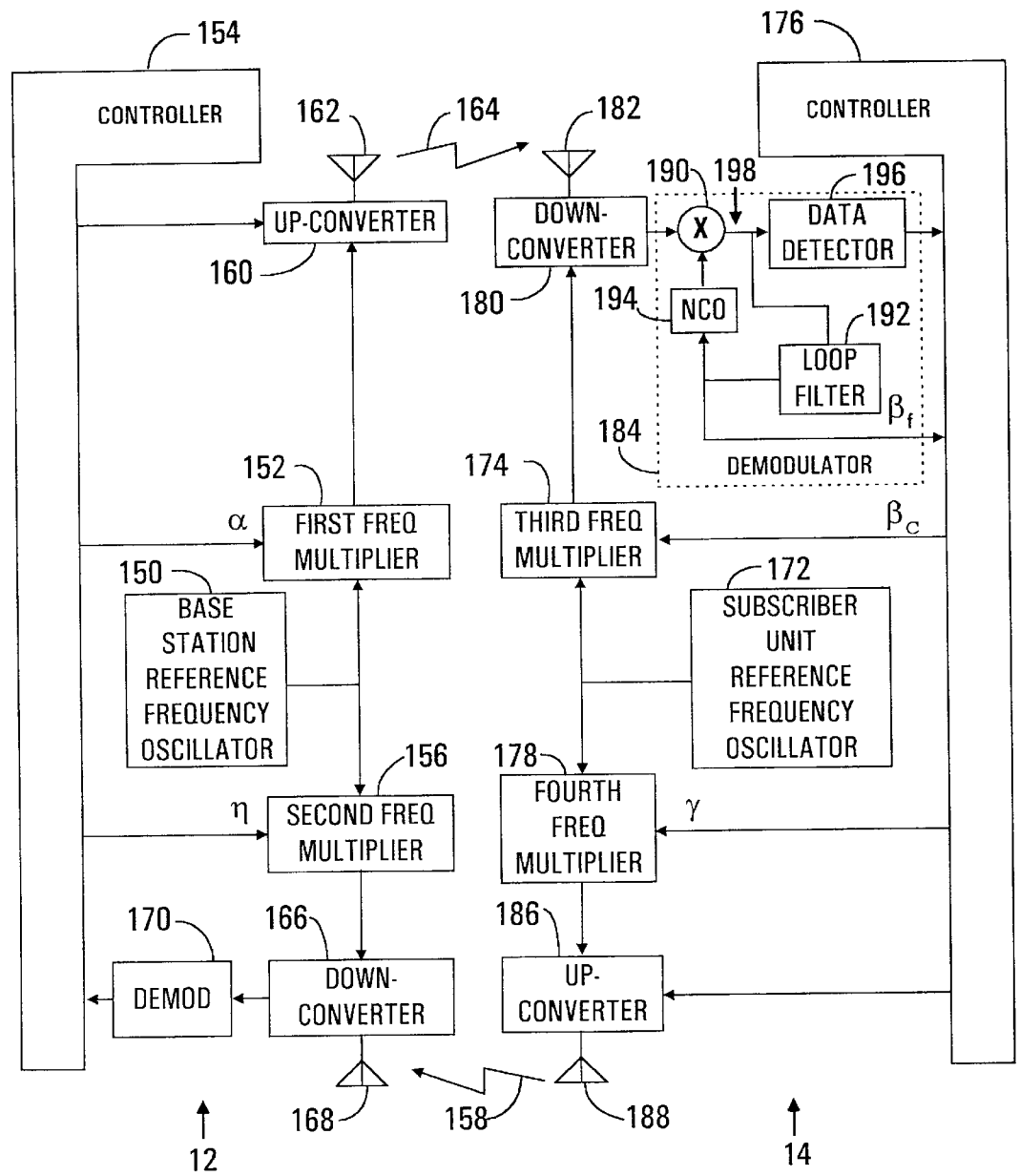
FIG. 9 is a simplified block diagram of a radio communication system in accordance with the present invention.

FIGS. 9 through 12 illustrate a preferred embodiment of a radio communication system 10 which provides rapid synchronization of a subscriber unit transmitting frequency to a base station 12 receiving frequency. While FIG. 9 shows only one subscriber unit 14 for convenience, any number of subscriber units 14 may be associated with a base station 12, as discussed above.

FIG. 9 shows a block diagram of base station 12 and subscriber unit 14. A base station oscillator 150 provides a base station reference frequency. An output of oscillator 150 couples to a first frequency multiplier 152. A first output from a base station controller 154 couples to a second input of first frequency multiplier 152. The output of base station reference frequency oscillator 150 also connects to a first input of a second frequency multiplier 156. A second output from controller 154 couples to a second input of second frequency multiplier 156. Base station reference frequency oscillator 150 and second frequency multiplier 156 generate a frequency at which demodulation of reverse channel signal 158 can occur. An output of first frequency multiplier 152 is coupled to a first input of an up-converter 160. Controller 154 has a third output that couples to a second input of up-converter 160 and supplies data to up-converter 160 for transmission. Up-converter 160 transmits a signal conveying the data to an antenna 162. When a signal from antenna 162 is radiated to subscriber unit 14, a "forward" channel signal 164 is generated. The terms "forward" channel and "reverse" channel are employed here only to distinguish one operation from the other. When a subscriber unit transmits to a base station, it is understood to be a "reverse" channel operation. When a base station transmits to a subscriber unit, it refers to a "forward" channel operation. An output of second frequency multiplier 156 connects to a down-converter 166. Down-converter 166 receives a signal from an antenna 168. An output of down-converter 166 couples to an input of a demodulator 170. An output of demodulator 170 couples to an input of controller 154.

A subscriber unit oscillator 172 provides a subscriber unit reference frequency. An output of oscillator 172 couples to a third frequency multiplier 174. A first output from a subscriber unit controller 176 couples to a second input of third frequency multiplier 174. The output of subscriber unit reference frequency oscillator 172 also connects to a first input of a fourth frequency multiplier 178. A second output from controller 176 couples to a second input of fourth frequency multiplier 178. An output of third frequency multiplier 174 couples to an input of a down-converter 180. Down-converter 180 receives a signal from an antenna 182. An output of down-converter 180 connects to an input of a demodulator 184. A first output of demodulator 184 provides digital data conveyed by the signal received at antenna 182 and couples to an input of controller 176. A second output of demodulator 184 provides a digital constant determined in response to synchronizing subscriber unit 14 to the signal received at antenna 182 and couples to an input of controller 176. An output of fourth frequency multiplier 178 connects to a first input of an up-converter 186. A third output of controller 176 couples to a second input of up-converter 186. Up-converter 186 transmits a signal to an antenna 188.

Demodulator 184 includes a phase comparator 190, a loop filter 192, a numeric controlled oscillator (NCO) 194 and a data detector 196. The output of down-converter 180 connects to a first input of phase comparator 190. The output of NCO 194 connects to a second input of phase comparator 190. The output of phase comparator 190 couples to an input of data detector 196 and to an input of loop filter 192. An output of data detector 196 provides the first output of demodulator 184 as previously described. The output from loop filter 192 provides the second output of demodulator 184 as previously described. The output from loop filter 192 also connects to an input of NCO 194. Those skilled in the art will appreciate that phase comparator 190, loop filter 192, and NCO 194 form a phase locked loop 198, which is a well-known circuit to those skilled in the art of digital demodulators and useful in achieving spectral coherence with a received signal. Although a single output is shown from down-converter 180 for the sake of simplicity, phase locked loop 198 in the preferred embodiments works in quadrature.

When base station 12 transmits to subscriber unit 14, forward channel signal 164 is radiated from antenna 162. When subscriber unit 14 transmits to base station 12, reverse channel signal 158 is radiated from antenna 188. The timing relationship between base station and subscriber unit transmission is shown in FIG. 10.

Figure 10:
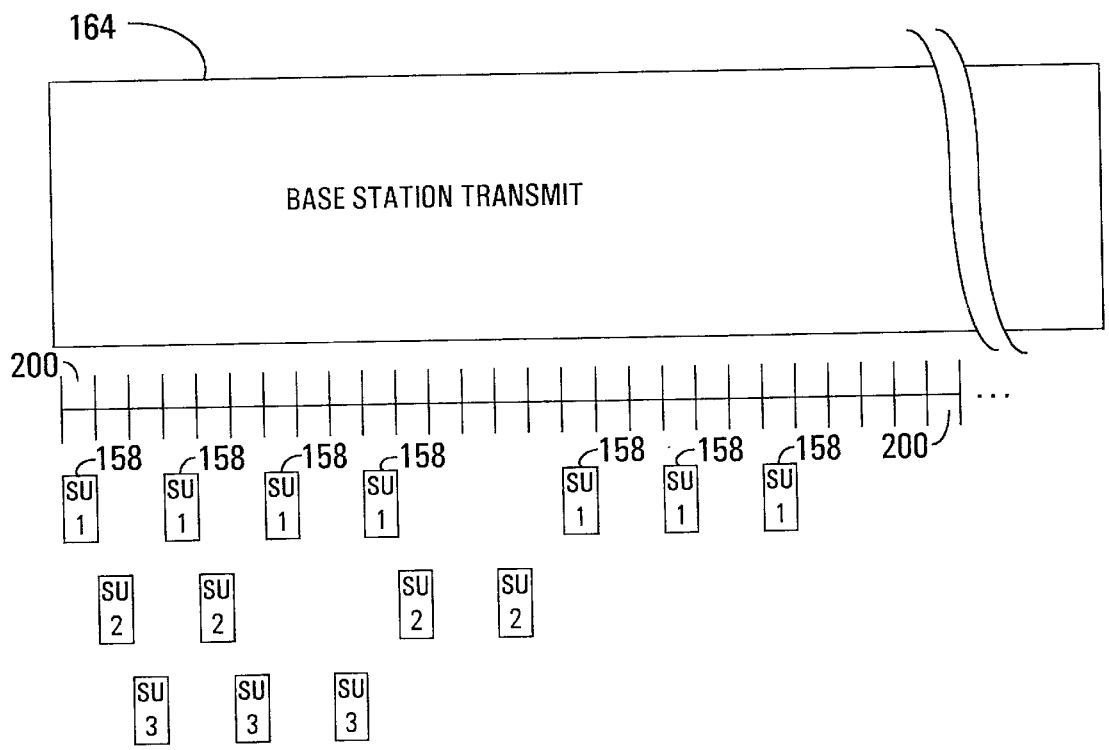
FIG. 10 is a timing diagram of bi-directional communications in the communication system shown in FIG. 9.

FIG. 10 shows a base station 12 transmitting a continuous forward channel signal 164 to a group of subscriber units 14. The preferred embodiment shows burst mode reverse channel signals 158. Subscriber units transmit short reverse channel "bursts" to base station 12 according to their assigned timeslots 200. As soon as one subscriber unit has ended its transmission, another subscriber unit may begin transmitting. The precise frequencies of reference frequency signals from subscriber unit oscillators 172 vary considerably according to different subscriber units 14. These variations in frequency among subscriber units 14 are typically caused by differing oscillators 172. Desirably, low cost oscillators are used in subscriber units 14 to reduce overall subscriber unit costs. Such low cost oscillators may exhibit poor accuracy and frequency drift.

The forward channel characteristics of the preferred embodiment of this invention show base station 12 transmitting continuously to subscriber units 14, but other embodiments might not necessarily employ continuous transmission by the base station. For purposes of the present embodiment, the period of forward channel signal 164 substantially exceeds the period of reverse channel signal 158.

Conventional synchronization techniques require overhead processing time for base station demodulator 170 to "lock on" to the subscriber unit transmitting frequency of reverse channel signal 158. If the signal-to-noise ratio is low or if there are excessive variations between the subscriber unit transmit frequency and the base station receive frequency, the overhead time spent achieving synchronization is time unavailable for conveying subscriber unit data. The base station receive frequency may be understood as the frequency at which signals 158 may be demodulated without first requiring significant frequency synchronization. Since there is constant and frequent switching of the reverse channel between different subscriber units 14, synchronization time is desirably held to a minimum to use the allocated spectrum efficiently. Desirably, base station 12 synchronizes to a different subscriber unit 14 as soon as possible upon initiation of a new time slot 200.

Using conventional phase locked loop synchronization techniques, it is impractical to attempt a rapid synchronization at base station demodulator 170 because signal characteristics are too uncertain due to the inherent nature of burst mode signal characteristics to permit accurate frequency estimates based on small sample sizes. In other words, the short bursts do not convey enough information to resolve the uncertainties of the received signal and then convey a significant quantity of user data. Present coherent demodulation techniques require large sample sizes obtained by listening to received signals for an undesirably long time before useful data may be extracted. Certain differential demodulation techniques may permit rapid synchronization, but only at the price of up to a 3 dB signal-to-noise ratio penalty for a given received signal.

In general, system 10 provides certain data to subscriber units 14 which allows them to adjust their transmit frequencies such that reverse channel signals 158 received by base station 12 from different subscriber units 14 are already frequency synchronized with base station demodulator 170. Thus base station 12 need not perform significant time-consuming frequency synchronization tasks.

Figure 11:
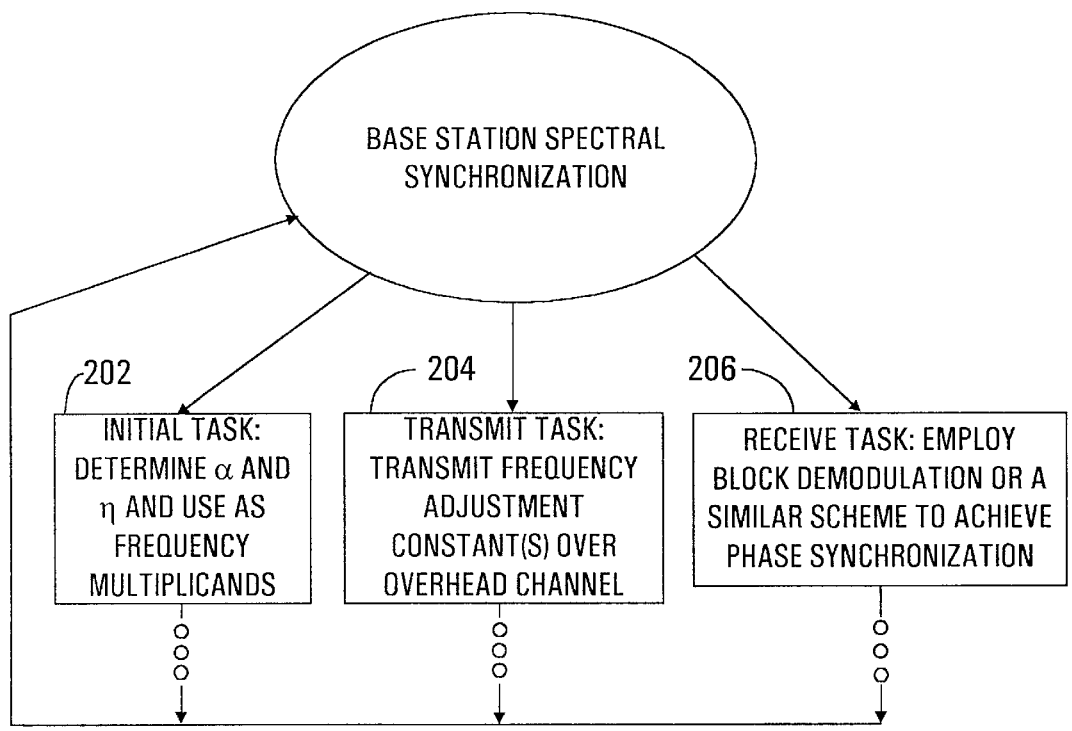
FIG. 11 is a flowchart of tasks performed by the communication system shown in FIG. 9 to achieve base station receiver synchronization.

FIG. 11 shows a chart of tasks performed by base station 12 to achieve spectral synchronization of demodulator 170 with reverse channel signals 158 from subscriber units 14. Prior to performing a transmit or receive operation, base station 12 performs an initial task 202. Task 202 calculates two constants, $\alpha$ and $\eta$, for use as frequency multiplicands. Constant $\alpha$ is used with first frequency multiplier 152 to define the frequency of forward channel signal 162. Constant $\eta$ is used with second frequency multiplier 156 to define the frequency at which signals 158 may be demodulated without first requiring significant frequency synchronization. This frequency may be understood as the base station receiving frequency.

After calculating and using $\alpha$ and $\eta$, base station controller 154 performs a task 204 to transmit a frequency adjustment constant along with other data directed to subscriber unit 14 using forward channel signal 164. The "frequency adjustment constant" in the preferred embodiment consists of both $\alpha$ and $\eta$. Controller 154 sends a digital data stream containing, in addition to the frequency adjustment constant, data directed to subscriber units 14. While the preferred embodiment transmits $\alpha$ and $\eta$ during task 204, other embodiments may transmit other frequency constants based upon $\alpha$ and $\eta$. Such other constants may be a ratio of $\alpha$ and $\eta$ or other functions of $\alpha$ and $\eta$.

During the reverse channel receive operation, base station controller 154 performs a receive synchronizing task 206. Demodulator 170 will already be frequency synchronized, for the most part, to signal 158 at the beginning of each reverse channel time slot 200 (see FIG. 10), and no data will be lost. However, signal 158 will not necessarily be phase synchronized at the beginning of the reverse channel time slot 200. Block demodulation or a similar scheme familiar to those skilled in the art can be used to achieve phase synchronization at demodulator 170 without loss of data.

Those skilled in the art will appreciate that there are many other tasks performed by controller 154, as indicated by the ellipses shown in FIG. 11. Such tasks are not relevant to the preferred embodiment of the present invention.

Figure 12:
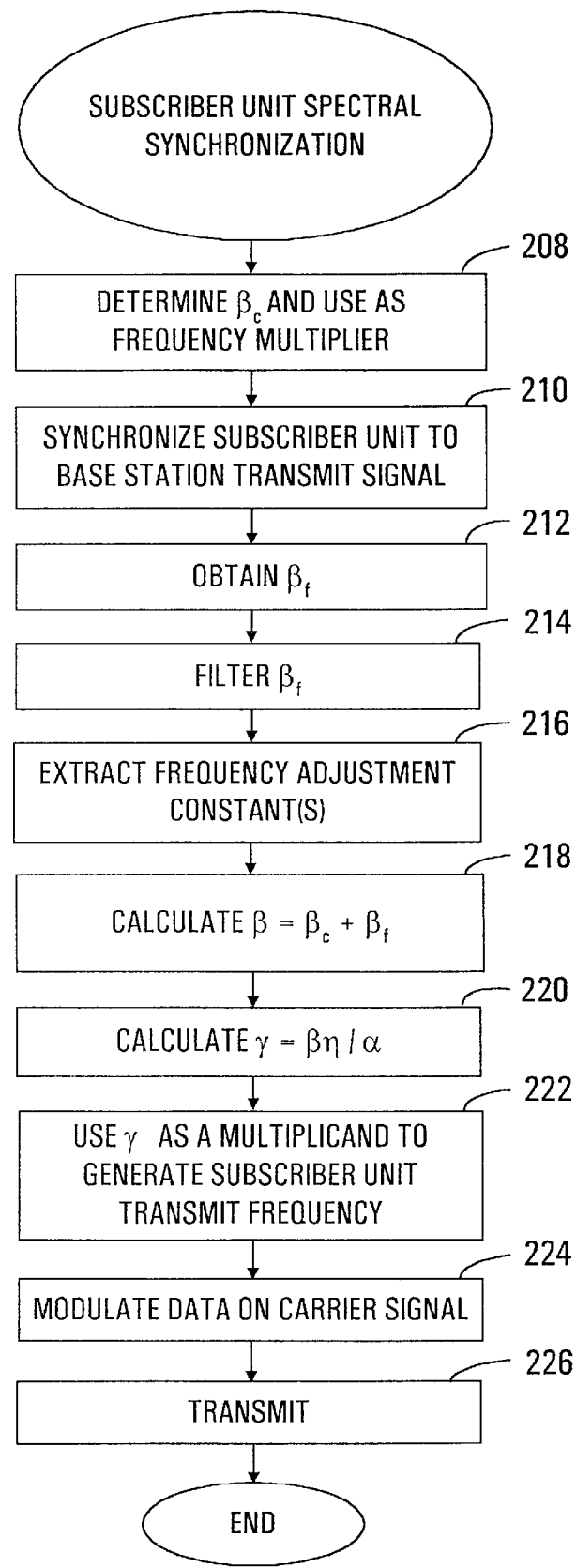
FIG. 12 is a flow chart of the tasks performed by the system shown in FIG. 9 to achieve rapid synchronization of a subscriber unit transmit frequency to a base station receiver frequency.

FIG. 12 shows a flow chart of tasks that subscriber unit 14 performs so that reverse channel signal 158 is frequency synchronized to base station demodulator 170. An initial task 208 for subscriber unit controller 176 provides a coarse frequency constant $\beta_c$ to third frequency multiplier 174 (see FIG. 9). Coarse constant $\beta_c$ is determined in response to the anticipated frequency of forward channel signal 164 and the frequency of oscillator 172. Subscriber unit 14 converts forward channel signal 164 to baseband using the subscriber unit reference frequency 172 multiplied by constant $\beta_c$. Subscriber unit 14 has now achieved an extremely coarse synchronization with forward channel signal 164. The difference in frequency between the product of the subscriber unit reference frequency 172 times $\beta_c$ and the actual received forward channel signal 164 is called the "offset" frequency or "frequency error constant" herein.

As indicated in a task 210, demodulator 184 synchronizes to the baseband form of forward channel signal 164. When demodulator 184 locks onto, or is synchronized with, the frequency of forward channel signal 164, the following equation holds true: $\alpha f_{bs} = \beta f_{sref}$. In other words, the product of $\alpha$ times the frequency ($f_{bs}$) of the base station reference oscillator 150 equals the product of $\beta$ times the frequency ($f_{sref}$) of subscriber unit reference oscillator 172.

Phase locked loop 198 of demodulator 184 determines the value of the offset frequency in a conventional manner. A constant value generated by loop filter 192, defined herein as beta-fine ($\beta_f$), characterizes this offset and is sent to controller 176 in a task 212.

The subscriber unit "beta" ($\beta$) constant equals the sum of $\beta_c$ and $\beta_f$, or $\beta = \beta_c + \beta_f$. However, an instantaneous value of $\beta_f$ or $\beta$ may be too error prone without filtering. Accordingly, digital filtering and/or statistical averaging of $\beta_f$ is performed by controller 176 during a task 214.

Subscriber unit demodulator 184 can now begin extracting data from the digital data stream transmitted by the base station on the forward channel signal 164. Data from demodulator 184 is delivered to controller 176 for processing. The digital data stream contains overhead channel information such as call setup parameters, modulation order, time slot block allocations, and timing offsets as well as data comprising the subscriber unit message and the above-discussed frequency adjustment constant.

During a task 216 frequency adjustment constants $\alpha$ and $\eta$ are extracted from the incoming digital data stream by demodulator 184 and presented to controller 176 along with data conveyed by forward channel signal 164. Controller 176 then calculates the subscriber unit receive frequency constant $\beta$ using constants $\beta_f$ and $\beta_c$ during a task 218.

Once the subscriber unit controller 176 has received $\alpha$ and $\eta$ and calculated $\beta$, it can now perform task 220, in which it calculates a fourth frequency constant gamma ($\gamma$). To assure a substantial match of the subscriber unit transmit frequency to the base station receive frequency, gamma ($\gamma$) should equal the product of the ratio of beta ($\beta$) to alpha ($\alpha$) multiplied by eta ($\eta$), or $\gamma=\beta\eta/\alpha$. During a task 222, controller 176 supplies $\gamma$ to multiplier 178 so that the subscriber unit reference frequency is multiplied by $\gamma$ to arrive at a frequency for which base station demodulator 170 is already synchronized.

During a task 224 controller 176 supplies data which up-converter 186 modulates onto the carrier signal. The carrier signal "carries" information when it has been modulated. The subscriber unit carrier signal is supplied by fourth frequency multiplier 178. Data from controller 176 is coupled to the second input of up-converter 186 described above.

During a task 226 the output of up-converter 186 is transmitted from antenna 188 as reverse channel signal 158. When the data for the current time slot 200 has been transmitted to the base station 12, transmit operation 226 terminates.

In summary, the present invention provides an improved local multipoint distribution system. The present system simultaneously accommodates a wide range of data rates. Sizes of time slot blocks assigned to each call are determined in response to a data rate requirement and in response to a modulation order which can be accommodated between a stationary subscriber unit and a stationary cell site. The present system efficiently utilizes a given spectrum. Data communications are conducted at variable modulation order and preferably at the highest modulation order supported by current conditions. A spatial diversity scheme allows the spectrum to be reused multiple times at each cell site. Reverse channels are temporally and spectrally coherent with forward channels to reduce overhead communications. Reverse channels transmit at a frequency to which the base station demodulator is already frequency synchronized.

The present invention has been described above with reference to a preferred embodiments. However, those skilled in the art will recognize that changes and modifications may be made in these preferred embodiments without departing from the scope of the present invention. For example, in an alternative embodiment, the overhead section of the reverse channel may be assigned to any number of time slots as deemed appropriate by the cell site and interleaved with other time slots rather than given a static position within the frames. In addition, those skilled in the art will appreciate that processes performed at base stations and at subscriber units may classify and sequence tasks differently than discussed herein while achieving equivalent results. These and other changes and modifications which are obvious to those skilled in the art are intended to be included within the scope of the present invention.

What is claimed is:

1. A method for rapid frequency synchronization of a reverse channel signal to a base station receiving frequency which is proportional to $\eta$ (eta) times a base station reference frequency, where $\eta$ is a first value, said method comprising the steps of:

transmitting a frequency adjustment value at a base station transmitting frequency from a base station to a subscriber unit, said base station transmitting frequency being proportional to $\alpha$ (alpha) times said base station reference frequency, where $\alpha$ is a second value;

extracting said frequency adjustment value at said subscriber unit;

calculating, at said subscriber unit, a frequency multiplier in response to said frequency adjustment value so that said multiplier is proportional to $\eta$ and inversely proportional to $\alpha$; and generating said subscriber unit transmitting frequency in response to said radio frequency multiplier.

2. A method as claimed in claim 1 additionally comprising the step of configuring said frequency adjustment value to be responsive to said base station receiving frequency.

3. A method is claimed in claim 1 wherein:

said transmitting step transmits said frequency adjustment value using a base station transmit signal which is continuously transmitted for a first predetermined duration; and said subscriber unit transmitting frequency is exhibited by a subscriber unit transmit signal which is continuously transmitted for a second predetermined duration, said second predetermined duration being shorter than said first predetermined duration.

4. A method as claimed in claim 1 wherein:

a subscriber unit receiving frequency and said subscriber unit transmitting frequency are each responsive to a subscriber unit reference frequency.

5. A method as claimed in claim 4 wherein:

said method additionally comprises the step of synchronizing said subscriber unit receiving frequency to said base station transmit frequency.

6. A method as claimed in claim 4 wherein:

said subscriber unit receiving frequency is proportional to $\beta$ (beta) times said subscriber unit reference frequency, where $\beta$ is a third value; and said calculating step comprises the step of making said multiplier proportional to $\beta$.

7. A method as claimed in claim 6 wherein said generating step comprises the step of multiplying said subscriber unit reference frequency by said multiplier.

8. A method for rapid synchronization of a subscriber unit transmitting frequency to a base station receiving frequency which is proportional to $\eta$ (eta) times a base station reference frequency, where $\eta$ is a first value, said method comprising the steps of:

causing said base station receiving frequency and a base station transmitting frequency to be responsive to a base station reference frequency, said base station transmitting frequency being proportional to $\alpha$ (alpha) times said base station reference frequency, where $\alpha$ is a second value;

causing a subscriber unit receiving frequency and said subscriber unit transmitting frequency to be responsive to a subscriber unit reference frequency, said subscriber unit receiving frequency being proportional to $\beta$ times said subscriber unit reference frequency, where $\beta$ is a third value;

transmitting a frequency adjustment value from said base station to said subscriber unit, said frequency adjustment value being responsive to said base station reference frequency;

synchronizing said subscriber unit receiving frequency to said base station transmit frequency;

extracting said frequency adjustment value at said subscriber unit;

calculating, at said subscriber unit, a radio frequency multiplier in response to said frequency adjustment value so that said multiplier is proportional to η and to β and inversely proportional to α; and generating said subscriber unit transmitting frequency in response to said radio frequency multiplier and said subscriber unit reference frequency.

9. A method as claimed in claim 8 wherein said generating step comprises the step of multiplying said subscriber unit reference frequency by said multiplier.

10. A method is claimed in claim 8 wherein:

said base station transmit signal is continuously transmitted for a first predetermined duration; and said subscriber unit transmitting frequency is exhibited by a subscriber unit transmit signal which is continuously transmitted for a second predetermined duration, said second predetermined duration being shorter than said first predetermined duration.

11. A communication system for rapid synchronization of a subscriber unit transmitting frequency to a base station receiving frequency, said system comprising:

a base station reference oscillator which generates a base station reference frequency;

a first frequency multiplier coupled to said base station reference oscillator, said first frequency multiplier being configured to multiply said base station reference frequency by a first multiplicand;

a base station up-converter coupled to said first frequency multiplier, said base station up-converter generating a base station transmit signal;

a second frequency multiplier coupled to said base station reference oscillator, said second frequency multiplier defining said base station receiving frequency, and said second frequency multiplier being configured to multiply said base station reference frequency by a second multiplicand;

a base station controller coupled to said first and second frequency multipliers and to said base station up-converter, said base station controller being configured to generate a frequency adjustment constant which is responsive to first and second multiplicands;

a base station down-converter coupled to said second frequency multiplier;

a subscriber unit reference oscillator which generates a subscriber unit reference frequency;

a third frequency multiplier coupled to said subscriber unit reference oscillator, said third frequency multiplier being configured to multiply said subscriber unit reference frequency by a third multiplicand;

a subscriber unit down-converter adapted to receive said base station transmit signal and coupled to said third frequency multiplier;

a fourth frequency multiplier coupled to said subscriber unit reference oscillator, said fourth frequency multiplier being configured to multiply said subscriber unit reference frequency by a fourth multiplicand;

a subscriber unit up-converter coupled to said fourth frequency multiplier, said subscriber unit up-converter generating said subscriber unit transmitting frequency; and a subscriber unit controller coupled to said subscriber unit down-converter, said third multiplier and said fourth multiplier, said subscriber unit controller being configured to obtain said frequency adjustment constant and to calculate said fourth multiplicand in response to said frequency adjustment constant.

12. A radio communication system as claimed in claim 11 additionally comprising a demodulator having an input coupled to said subscriber unit down-converter and an output coupled to said subscriber unit controller, said demodulator being configured to achieve frequency synchronization with said base station transmit signal.

13. A communication system as claimed in claim 12 wherein:

said demodulator generates a frequency error constant; and said subscriber unit controller is configured to adjust said third multiplier in response to said frequency error constant.

* * * * *